United States Patent [19]

Yoshizawa

[11] Patent Number: 4,527,104
[45] Date of Patent: Jul. 2, 1985

[54] SPEED CONTROL APPARATUS FOR D.C. MOTOR

[75] Inventor: Fukashi Yoshizawa, Tatsuno, Japan

[73] Assignee: Olympus Optical Company, Ltd., Japan

[21] Appl. No.: 498,845

[22] Filed: May 27, 1983

[30] Foreign Application Priority Data

Aug. 24, 1982 [JP] Japan .................. 57-145510

[51] Int. Cl.³ .............................................. G05B 5/00
[52] U.S. Cl. .............................. 318/331; 318/345 F; 318/345 B
[58] Field of Search ............... 318/345 F, 345 B, 331, 318/317

[56] References Cited

U.S. PATENT DOCUMENTS

| | | | |
|---|---|---|---|
| 3,475,672 | 10/1969 | Oltendorf | 318/331 X |
| 3,560,828 | 2/1971 | Kobayashi et al. | 318/345 F |
| 3,624,474 | 11/1971 | Nolf | 318/331 |
| 3,710,219 | 1/1973 | Takahashi et al. | 318/331 |
| 3,777,244 | 12/1973 | Kosaka | 318/331 |
| 4,048,549 | 9/1977 | Satoh | 318/345 F |
| 4,151,450 | 4/1979 | Fukuma et al. | 318/317 |
| 4,163,182 | 7/1979 | Tanikoshi | 318/331 |

FOREIGN PATENT DOCUMENTS

| | | | |
|---|---|---|---|
| 71283 | 5/1982 | Japan | 318/345 B |
| 71287 | 5/1982 | Japan | 318/331 |

*Primary Examiner*—Ulysses Weldon
*Attorney, Agent, or Firm*—Ostrolenk, Faber, Gerb & Soffen

[57] ABSTRACT

A speed control apparatus for a d.c. motor includes a bridge circuit which operates to detect a speed error signal. The speed error signal is applied to a Schmidt trigger circuit, an output of which is used to cause a switching operation of a power supply circuit for the motor in order to control the speed thereof. The apparatus minimizes power dissipation and improves efficiency.

9 Claims, 8 Drawing Figures

SPEED CONTROL APPARATUS FOR D.C. MOTOR

BACKGROUND OF THE INVENTION

The invention relates to a speed control apparatus for a d.c. motor, and more particularly, to such apparatus which incorporates a switching control.

A conventional speed control apparatus for d.c. motor is illustrated in FIG. 1. Specifically, a d.c. motor 1 defines a branch of a bridge circuit, the remaining branches of which are defined by resistors 2, 3 and 4. The bridge circuit includes a pair of detecting terminals A, B, and a voltage detected thereacross may be compared against a reference voltage 7 by an error detector formed by a combination of a transistor 6 and a resistor 5. The error detector detects a difference therebetween, which may be used to control a feed transistor 8, thus controlling the power supplied to the motor to thereby control the speed thereof. In such an arrangement, the feed transistor 8 operates in its active region, and hence a voltage drop across the emitter and collector represents a Joule loss, causing a reduced efficiency.

SUMMARY OF THE INVENTION

It is an object of the invention to eliminate the described disadvantage of a conventional speed control apparatus, by providing a speed control apparatus for a d.c. motor having an improved efficiency. The efficiency is improved by reducing Joule losses in the feed control circuit, which is achieved by applying an output from an error detector, which detects the rotational speed of the motor, to a Schmidt trigger circuit, an output pulse of which is used to control the feed control circuit.

In accordance with the invention, the feed transistor which feeds power to the d.c. motor operates in a switching mode in order to control the speed of the motor. This reduces Joule losses and the power dissipation, thus improving the efficiency. A reduction in the amount of heat generated by the feed transistor increases the freedom in the circuit design. The use of the Schmidt trigger circuit to cause a switching operation of the feed transistor achieves a stable operation of the feed control circuit.

DESCRIPTION OF PREFERRED EMBODIMENTS

Figure 1:
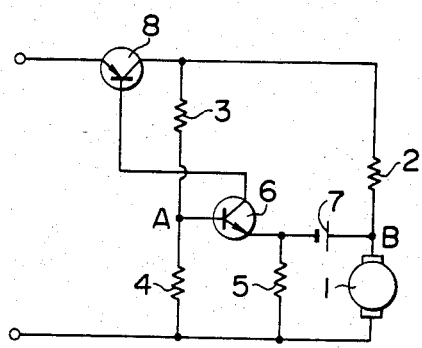
FIG. 1 is a circuit diagram of an exemplary form of conventional speed control apparatus for d.c. motor.
Figure 2:
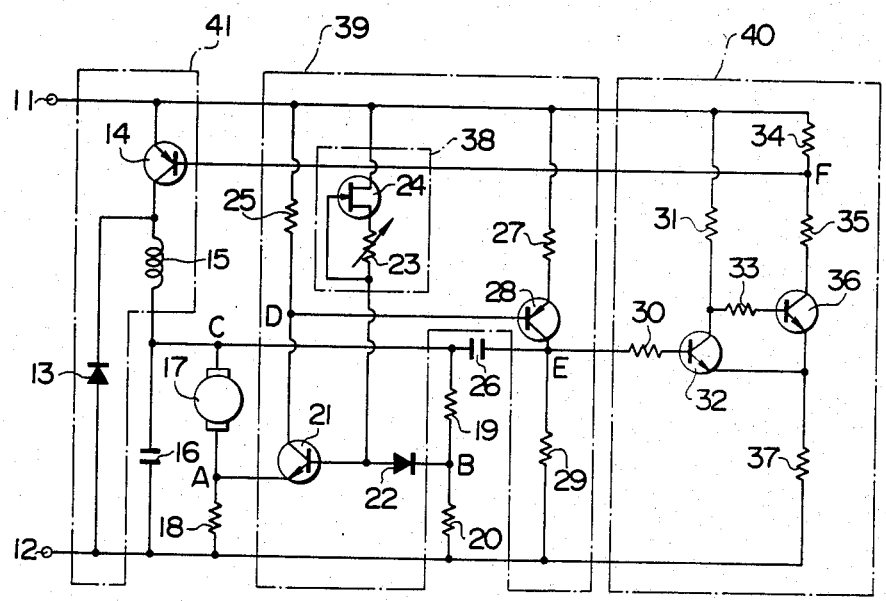
FIG. 2 is a circuit diagram of a speed control apparatus for d.c. motor according to a first embodiment of the invention.

Referring to FIG. 2, there is shown a circuit diagram of a speed control apparatus for d.c. motor according to a first embodiment of the invention. In FIG. 2, a bridge circuit is formed across positive and negative terminals 11, 12 of a d.c. source, by a d.c. motor 17 and resistors 18, 19 and 20. An error amplifier 39 is connected across a pair of detecting terminals A, B of the bridge circuit for detecting the rotational speed of the motor 17. An output from the amplifier 39 is fed to a Schmidt trigger circuit 40, the output of which is applied to a feed control circuit 41 which operates to control the power supplied to the motor.

The error amplifier 39 comprises an NPN transistor 21 having its emitter connected to the terminal A of the bridge circuit, a diode 22 having its cathode connected to the terminal B of the bridge circuit and having its anode connected to the base of the transistor 21, a constant current source 38 having its one end connected to the junction between the base of the transistor 21 and the anode of the diode 22, a resistor 25 connected to the collector of the transistor 21, a PNP transistor having its base connected to the collector of the transistor 21, a resistor 27 connected to the emitter of the transistor 28 and another resistor 29 connected to the collector of the transistor 28. The constant current source 38 comprises an N-channel field effect transistor 24 and a variable resistor 23 connected across the source and gate thereof.

The Schmidt trigger circuit 40 comprises a resistor 30 having its one end connected to the collector of the transistor 28 which represents the output of the error amplifier 39, an NPN transistor 32 having its base connected to the other end of the resistor 30, a resistor 31 connected to the collector of the transistor 32, a resistor 33 having its one end connected to the collector of the transistor 32, an NPN transistor 36 having its base connected to the other end of the resistor 33 and having its emitter connected to the emitter of the transistor 32, a resistor 35 having its one end connected to the collector of the transistor 36, a resistor 34 having its one end connected to the other end of the resistor 35 and its other end connected to the positive terminal 11 of the d.c. source, and a resistor 37 having its one end connected to the emitters of the transistors 32 and 36 and its other end connected to the negative terminal 12 of the d.c. source.

The feed control circuit 41 comprises a PNP feed transistor 14 having its emitter connected to the positive terminal 11 of the d.c. source and its base connected to the junction between the resistors 35 and 34 of the Schmidt trigger circuit 40 to receive an output thereof as an input, a coil 15 having one end connected to the collector of the transistor 14 and its other end connected to a feed terminal C of the bridge circuit, and a diode 13 having its cathode connected to the junction between the collector of the transistor 14 and the coil 15 and its anode connected to the other feed terminal which is connected to the negative terminal 12 of the d.c. source.

A capacitor 16 is connected in shunt with the bridge circuit and forms a low pass filter together with the coil 15. A capacitor 26 is connected between the feed terminal C of the bridge circuit and the collector of the transistor 28 in the error amplifier 39 for reducing any ripple component which may be contained in an input to the Schmidt trigger circuit 40 as a result of a sliding contact between a brush and a commutator of the d.c. motor.

The operation of the speed control apparatus will now be described. Representing the equivalent internal resistance of the d.c. motor 17 by $R_a$, and the resistance of the resistors 18, 19 and 20 by $R_{18}$, $R_{19}$ and $R_{20}$, respectively, the bridge circuit which is fed with a voltage $V_0$ will produce a voltage $V_{AB}$ across the detecting terminals A, B as follows:

$$V_{AB} = \frac{R_{20} \cdot R_a - R_{18} \cdot R_{19}}{(R_{18} + R_{20})(R_{18} + R_a) \cdot} V_0 + \frac{R_{18}}{R_{18} + R_a} \cdot E_M \quad (1)$$

where $E_M$ represents the back electromotive force of the motor 17. If the bridge balance condition $R_a \cdot R_{20} = R_{18} \cdot R_{19}$ is satisfied, this voltage can be rewritten as follows:

$$V_{AB} = \frac{R_{18}}{R_{18} + R_a} \cdot E_M = \frac{R_{18}}{R_{18} + R_a} \cdot K_v \cdot N \quad (2)$$

where $K_v$ represents a constant relating to the back electromotive force of the motor and N the rotational speed thereof. Thus it will be seen that under balanced bridge conditions, the voltage $V_{AB}$ depends on the rotational speed alone, and is independent from the magnitude of the torque.

Consequently, the error amplifier 39 which receives the voltage $V_{AB}$ from the bridge circuit as an input produces an output potential at point E which varies depending on the rotational speed of the motor 17. Thus, when the rotational speed of the motor 17 increases, the potential at point D within the error amplifier 39 reduces while an output of the error amplifier 39 or the potential at the point E increases.

When the potential at the point E, which represents an input to the Schmidt trigger circuit 40, increases to a point where it exceeds a threshold voltage representing the upper limit of the trigger circuit 40, the output of trigger circuit 4d potential at point F) assumes a high level, thereby turning the transistor 14 off. Hence, the power supply to the motor 17 is interruped. When the power supply is interrupted, the rotational speed of the motor reduces, whereby the potential at the point D within the error amplifier 39 rises while the output therefrom or the potential at the point E reduces. When the potential at the point E reduces below a threshold voltage which represents the lower limit of the trigger circuit 40, an output thereof or the potential at the point F changes to its low level, whereby the transistor 14 is turned on, thus resuming the power supply to the motor 17. The motor 17 is driven by repeating the described operation.

If the load on the motor 17 increases, the rotaional speed does not rise immediately if the feed transistor 14 is turned on. On the other hand, the rotational speed reduces quickly if the feed transistor 14 is turned off. In this manner, the time interval during which the motor 17 is energized increases while the time interval during which the power supply to the motor is interrupted reduces. On the contrary, the reverse is true if the load is reduced. Because a constant speed control of the motor 17 is achieved through a switching control of the feed transistor, the Joule losses produced in this transistor are reduced, thus reducing the power dissipation.

Figure 3A:
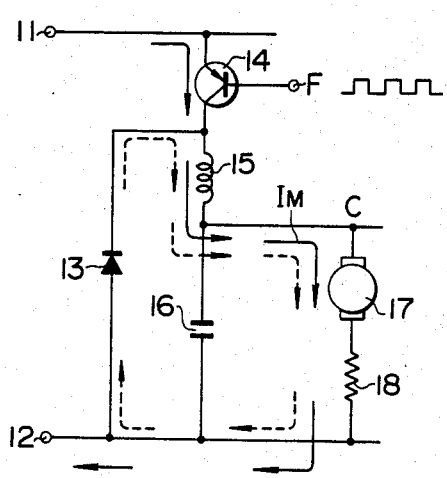
FIG. 3A is a schematic circuit diagram illustrating the operation of a feed control circuit used in the speed control apparatus of FIG. 2.
Figure 3B:
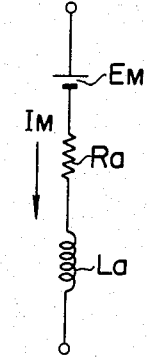
FIG. 3B shows an equivalent circuit of a d.c. motor.
Figure 3C:
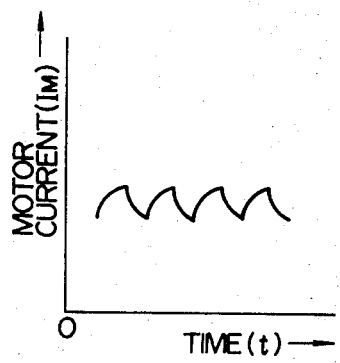
FIG. 3C graphically shows the waveform of a current pasing through the motor.

The operation of the feed control circuit 41 will be described with reference to FIG. 3. FIG. 3A illustrates the current path through the d.c. motor 17 when the feed transistor 14 is turned on and off while FIG. 3B shows the equivalent circuit of the d.c. motor. When the feed transistor 14 is turned on, current $I_M$ flows from the positive terminal 11 of the source through a path including the feed transistor 14, coil 15, motor 17 and resistor 18 to the negative terminal 12 of the source, such path being shown in solid line arrows in FIG. 3A. When the transistor 14 is switched from its on to its off condition, electromagnetic energy stored in the coil 15 as well as the equivalent internal inductance La of the motor 17 maintains a current flow through a closed path, shown in broken line arrows in FIG. 3A, including the coil 15, motor 17, resistor 18 and diode 13. Thus, a current flow is maintained through the motor 17 even though the feed transistor 14 is repeatedly switched, resulting in a pulsating current waveform as shown in FIG. 3C, thus stabilizing the rotation of the motor 17. The combination of the coil 15 and the capacitor 16 forms a low pass filter, which maintains the potential at the terminal C of the bridge circuit at a level which is closer to a constant value. The capacitor 16 suppresses parasitic oscillations to provide a stabilized operation. The feed transistor can be operated with a variable switching frequency which is determined by the time constant of the current path including the motor 17 as mentioned above and the magnitude of hysteresis of the Schmidt trigger circuit 40.

Figure 4:
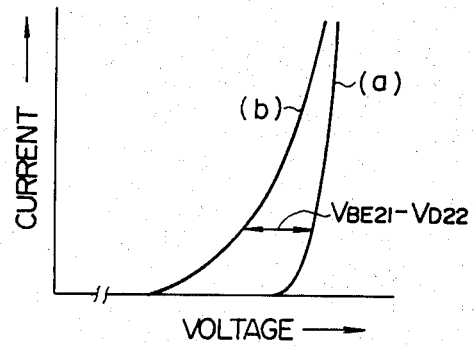
FIG. 4 graphically shows the voltage-current characteristic of the base-emitter part of the transistor and the voltage-current characteristic of a diode, both used in an error detector used in the apparatus of FIG. 2.

The rotational speed N of the motor 17 is determined in accordance with the equation (2) as follows:

$$N = \frac{1}{K_v} \cdot \frac{R_{18} + R_a}{R_{18}} \cdot V_{AB}$$

$$= \frac{1}{K_v} \cdot \frac{R_{18} + R_a}{R_{18}} \cdot (V_{BE21} - V_{D22})$$

where $V_{BE21}$ represents the voltage across the emitter and base of the transistor 21 and $V_{D22}$ the forward voltage across the diode 22. Thus, the rotational speed N can be determined by the term $(V_{BE21} - V_{D22})$, which can be established by changing the magnitude of current from the constant current source 38, by utilizing a difference in the current-voltage characteristic between the emitter and base of the transistor 21 and the diode 22 (specifically shown by curves (a) and (b) in FIG. 4). An adjustment of the variable resistor 23 allows a suitable choice of the magnitude of such current.

Figure 5:
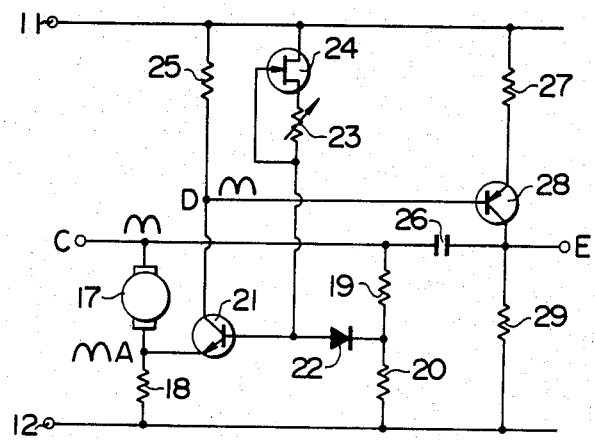
FIG. 5 is a schematic circuit diagram illustrating the ripple elimination achieved with the apparatus of FIG. 2.

Referring to FIG. 5, the function of the capacitor 26 will be described. Ripple components which are produced due to a sliding contact between a brush and a commutator of the motor 17 are developed across the feed terminal C and the detecting terminal A of the bridge circuit. Because they are not a direct indication of the back electromotive force or the rotational speed of the motor, if they are allowed to be amplified by the amplifier 39 and applied to the Schmidt trigger circuit 40, a stable switching operation which depends solely on the rotational speed of the motor 17 is prevented. However, when the capacitor 26 is connected between the feed terminal C of the bridge circuit and the output terminal E of the amplifier 39, ripple components coupled through the capacitor 26 and having the same phase as those present at the point C are superimposed on ripple components coupled to the terminal E through the amplifier 39 and having the opposite phase to those present at the point C, thus producing a net reduction in the ripple components, which assures a stable switching operation.

Figure 6:
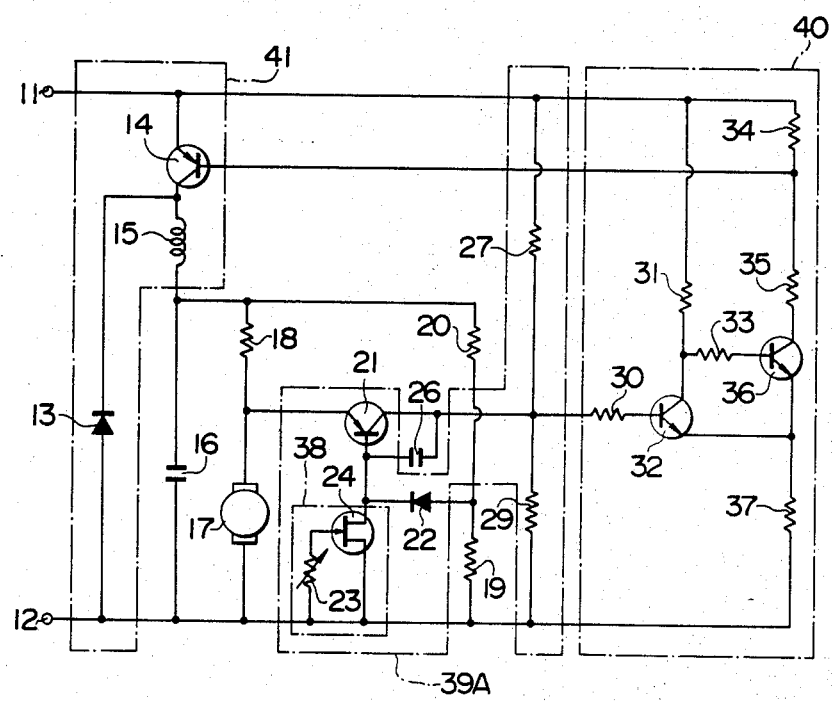
FIG. 6 is a circuit diagram of a speed control apparatus according to a second embodiment of the invention.

FIG. 6 shows a second embodiment of the invention in which the bridge circuit comprising the motor 17 and resistors 18, 19 and 20 is slightly modified by changing the position where the motor 17 is connected, with the arrangement of an error amplifier 39A connected across the pair of detecting terminals of the bridge circuit partly modified. It is to be noted that parts corresponding to those shown in the first embodiment are designated by like numerals. The second embodiment operates in the similar manner as the first embodiment, and therefore will not be specifically described. Again, Joule loss in the feed transistor can be reduced, thus providing an efficient speed control apparatus.

What is claimed is:

1. A speed control apparatus for a d.c. motor, comprising:
  a bridge circuit having first and second detecting terminals and first and second feed terminals, the bridge circuit comprising a d.c. motor connected between the first detecting terminal and the first feed terminal a first element connected between the first detecting terminal and the second feed terminal, a second element connected between the first feed terminal and the second detecting terminal and a third element connected between the second feed terminal and the second detecting terminal;
  an error amplifier connected across the first and second detecting terminals of the bridge circuit for receiving a difference voltage across the first and second detecting terminals and for amplifying the difference voltage to provide an output signal at an output;
  a Schmidt trigger circuit connected to the output of the error amplifier for receiving the output signal and for providing a trigger signal;
  a ripple capacitor connected between the first feed terminal of the bridge circuit and the output of the error amplifier for providing ripple components to the output of the error amplifier for reducing any ripple components included in the output signal; and
  a feed control circuit connected to at least one of the first and second feed terminals and responsive to the trigger signal for controlling the power supply to the d.c. motor.

2. The speed control apparatus of claim 1 in which each of the first, second and third elements is a resistor.

3. A speed control apparatus for a d.c. motor, comprising:
  a bridge circuit having first and second detecting terminals and first and second feed terminals, the bridge circuit comprising a d.c. motor connected between the first detecting terminal and the first feed terminal;
  an error amplifier connected across the first and second detecting terminals of the bridge circuit for receiving a difference voltage across the first and second detecting terminals and for amplifying the difference voltage to provide an output signal at an output;
  a Schmidt trigger circuit connected to the output of the error amplifier for receiving the output signal and for providing a trigger signal;
  a ripple capacitor connected between the first feed terminal of the bridge circuit and the output of the error amplifier for providing ripple components to the output of the error amplifier for reducing any ripple components included in the output signal; and
  a feed control circuit connected to at least one of the first and second feed terminals and responsive to the trigger signal for controlling the power supply to the d.c. motor.

4. The speed control apparatus of claim 3 in which the ripple components provided by the ripple capacitor are opposite in phase to the ripple components included in the output signal.

5. A speed control apparatus according to claim 3 in which the error amplifier comprises a transistor and a diode connected in series across the first and second detecting terminals, and a constant current source connected to the junction between the transistor and the diode.

6. A speed control apparatus according to claim 5 in which the constant current source comprises an N-channel field effect transistor and a variable resistor connected across the source and gate of the field effect transistor.

7. A speed control apparatus according to claim 3 in which the feed control circuit comprises a feed transistor connected to supply power to the bridge circuit from a power source and adapted to be turned on and off in response to the trigger signal from the Schmidt trigger circuit, a coil connected between the feed transistor and one of the first and second feed terminals of the bridge circuit, and a diode connected in shunt with a series circuit including the coil and the bridge circuit.

8. A speed control apparatus according to claim 5 in which the constant current source is capable of supplying a variable magnitude of current, thereby allowing a selection of a rotational speed of the d.c. motor.

9. A speed control apparatus according to claim 3, further including a suppressing capacitor connected across the first and second feed terminals of the bridge circuit for supressing parasitic oscillation of the entire apparatus to stabilize the operation thereof, the feed control circuit comprising a coil connected to one of the first and second feed terminals, the suppressing capacitor forming a low pass filter together with the coil.

* * * * *